(12) United States Patent
Feller

(10) Patent No.: US 8,448,526 B1
(45) Date of Patent: May 28, 2013

(54) DUAL PADDLEWHEEL FLOW SENSOR

(75) Inventor: Murray F Feller, Micanopy, FL (US)

(73) Assignee: Onicon, Inc., Clearwater, FL (US)

( * ) Notice: Subject to any disclaimer, the term of this patent is extended or adjusted under 35 U.S.C. 154(b) by 11 days.

(21) Appl. No.: 13/305,788

(22) Filed: Nov. 29, 2011

(51) Int. Cl.
*G01F 15/00* (2006.01)

(52) U.S. Cl.
USPC ........................................... 73/861.77

(58) Field of Classification Search
USPC ............... 73/861.77, 861.21, 861.23, 861.79
See application file for complete search history.

(56) References Cited

U.S. PATENT DOCUMENTS

| | | | | |
|---|---|---|---|---|
| 4,348,906 A | * | 9/1982 | Feller | 73/861.77 |
| 4,399,696 A | * | 8/1983 | Feller | 73/195 |
| 4,829,833 A | * | 5/1989 | Feller | 73/861.77 |

\* cited by examiner

*Primary Examiner* — Jewel V Thompson
(74) *Attorney, Agent, or Firm* — David Kiewit

(57) ABSTRACT

A paddlewheel flow sensor has two independently rotating paddlewheels in a flow passage. The spacing between the wheels can be selected to respond to most of the flow while simultaneously tolerating trash carried by the flowing fluid. Each wheel has its own rotation sensor, and an average of the two rotation sensor outputs can be used to determine flow rate.

6 Claims, 3 Drawing Sheets

DUAL PADDLEWHEEL FLOW SENSOR

BACKGROUND OF THE INVENTION

The invention relates to sensors in which a flowing fluid tangentially impacts the vanes of a paddlewheel.

BACKGROUND INFORMATION

In U.S. Pat. No. 4,399,696 the inventor teaches an arrangement for measuring fluid flow by averaging the outputs of two axially-fed turbines mounted on a probe. The disclosure of U.S. Pat. No. 4,399,696 is incorporated herein by reference.

Paddlewheel flow sensors generally provide a plurality of vanes, which may be flat or curved, and that run along a rotation axis of the wheel. A major portion of the wheel is shielded from direct impact of the flowing fluid, and the paddlewheel is rotated by flowing fluid impacting a selected tangential portion of it.

BRIEF SUMMARY OF THE INVENTION

A preferred embodiment of the invention provides apparatus for measuring a rate of flow of fluid along a pipe axis. This apparatus comprises two independently rotatable paddlewheels having separate rotation detectors and a circuit operable to combine the outputs of the two rotation rate detectors to generate a composite output representative of the rate of flow of the fluid. In a particular preferred embodiment the two paddlewheels have the same radius and rotate about mutually parallel rotation axes perpendicular to the pipe. In this embodiment the two rotation axes are symmetrically displaced from a center of the pipe. The apparatus is constructed so that only a respective tangential portion of each paddlewheel, the tangential portion being smaller than the common radius, is directly impacted by the fluid when the fluid is flowing.

In some embodiments of the invention two paddlewheels may be located so that while rotating they come close to each other but do not contact each other. The flow passage may also be restricted to the extent that almost all of the flow is in the channel occupied by the vanes of one wheel or the other. When these conditions are met, the wheels intercept virtually all of the flowing fluid so that flow profile variations, turbulence and rotational flow components have little effect on the sensor's accuracy. Even when those conditions are not met and most of the flow is not within the channel occupied by the vanes, the use of two flow rate sensing locations can significantly improve the accuracy over that of a conventional single wheel sensor.

Another aspect of the invention is that two paddlewheels can be spaced apart in a high bypass configuration providing a substantial clearance between the vanes of the two wheels. An arrangement of this sort can provide high tolerance to liquid-borne trash which can be a problem when measuring flow of water from a natural body, such as a lake or ocean, through a heat exchanger.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 2B is taken as indicated by the double-headed arrow 2-2 in FIG. 1.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

Figure 1:
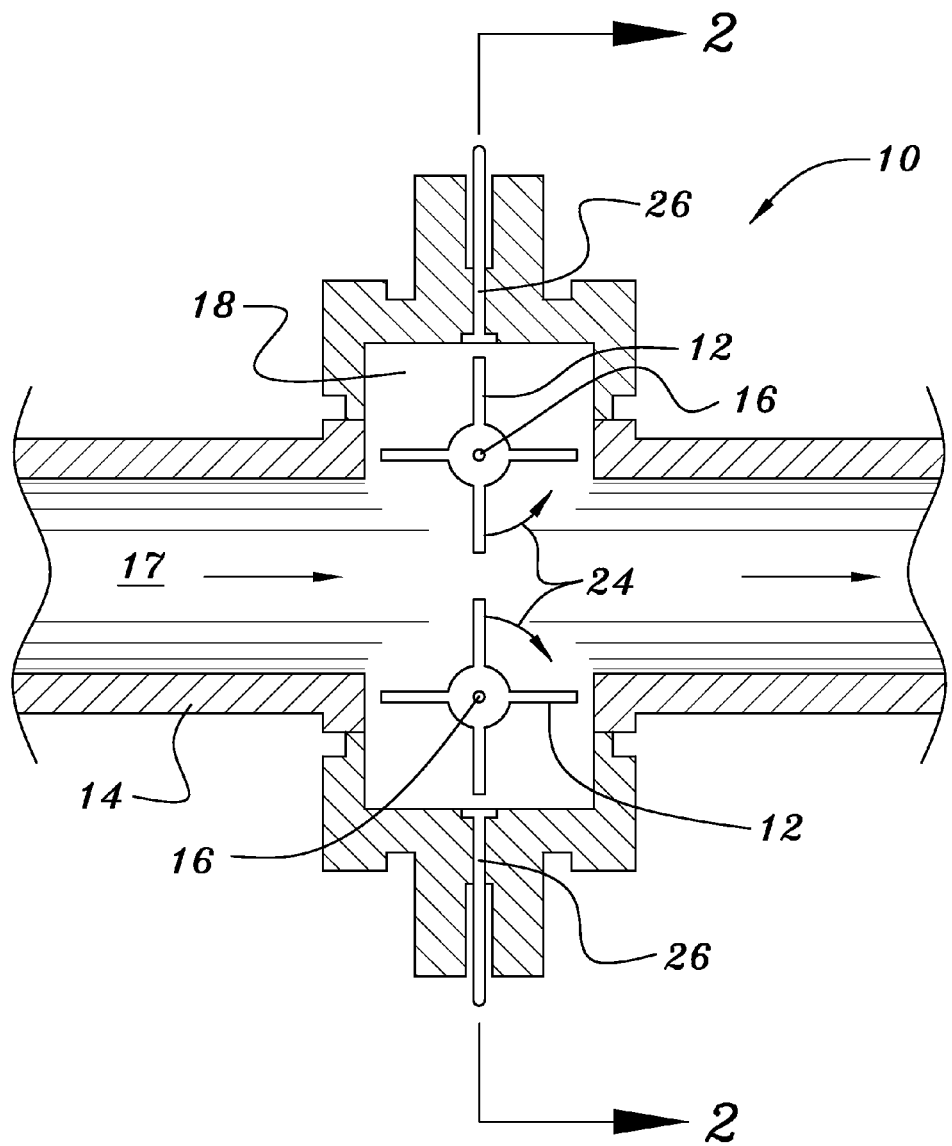
FIG. 1 is a partly schematic cross-sectional view of a dual paddlewheel sensor head of the invention disposed in a flow channel.

FIG. 1 depicts a sensing head portion 10 of an embodiment of a dual paddlewheel flow meter of the invention. In this depiction two paddlewheels 12 having a common diameter are symmetrically spaced apart from a centerline of a pipe 14 so that their respective rotational axes 16 are displaced from the centerline of the pipe by a bit more than a radius of the pipe. Hence, only a tangential portion of each paddlewheel is directly impacted by the flowing fluid 17, while most of each paddlewheel 12 is disposed within a flooded housing cavity 18.

Figure 2A:
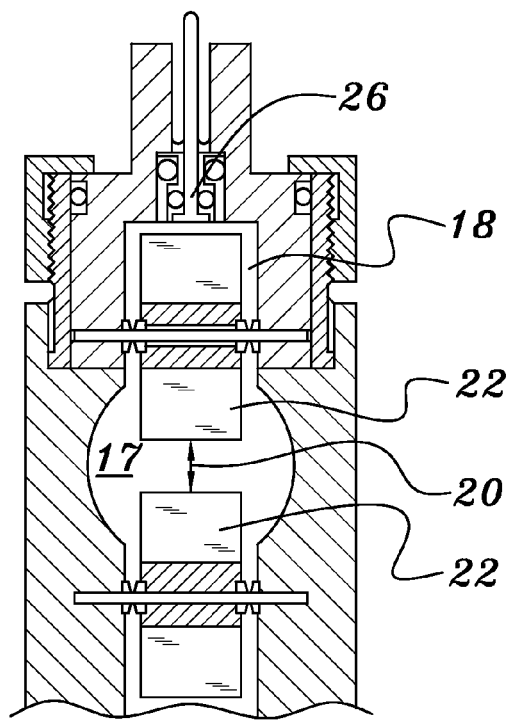
FIGS. 2A and 2B are partly cross-sectional views, from which some extraneous detail has been cut away, of paddlewheels having radial spacings selected either for tolerating flow-borne trash (FIG. 2A), or for higher output (FIG. 2B). The plane of section for both FIG. 2A
Figure 2B:
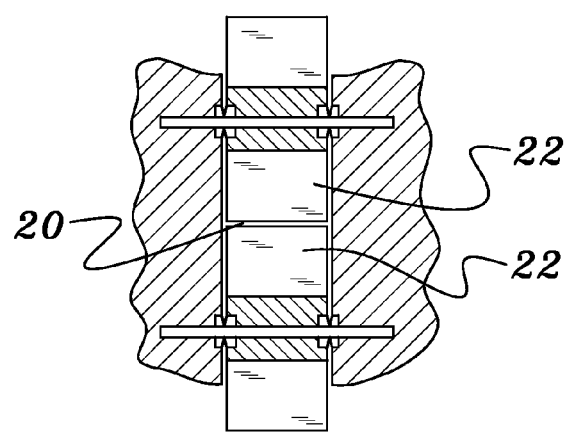

Because the paddlewheels are mechanically independent and may rotate at different rates (e.g., as might occur responsive to flow conditions that vary across the pipe), when the rotational axes 16 of the paddlewheels 12 are located directly across the pipe from each other one must provide a clearance 20 between the ends of the vanes 22 to prevent the paddlewheels from interfering with each other. A large clearance, as indicated in FIG. 2A, reduces the chance that flow-borne trash will clog or otherwise impair operation of the sensing head. Reducing the vane-to-vane clearance, as depicted in FIG. 2B, increases measurement accuracy because the closely spaced vanes 22 intercept more of the flowing fluid. An additional increase in the intercepted fraction of flow can be achieved by using a housing cavity having a size and cross-sectional shape selected so that the walls of the cavity are closely spaced from the edges and sides of the paddlewheels, as depicted in FIG. 2B for the case of a rectangular cavity and paddlewheels having rectangular vanes.

Figure 3:
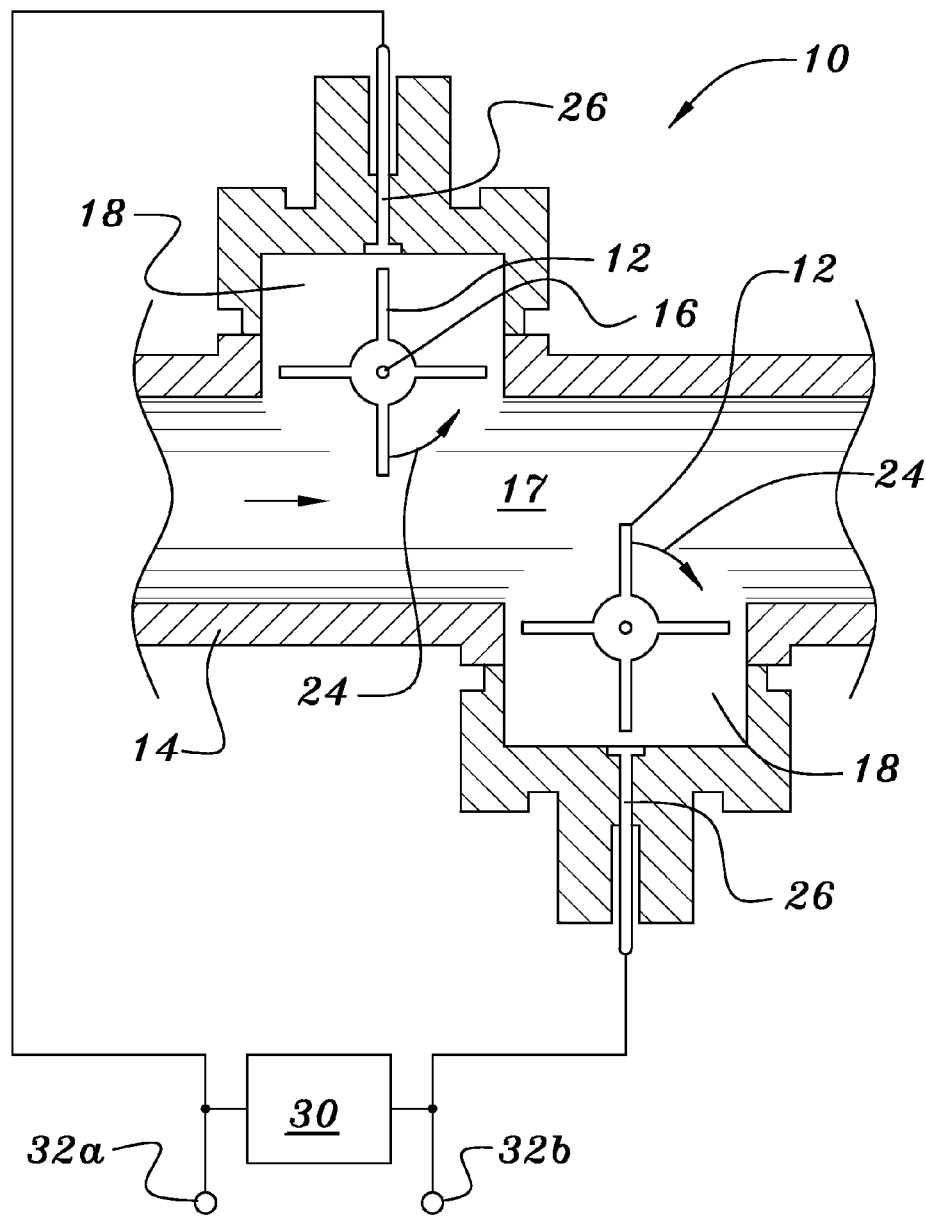
FIG. 3 is a schematic depiction of a dual paddlewheel sensor in which the paddlewheels are displaced along the flow axis.

An alternate embodiment of a flow sensing head of the invention is depicted in FIG. 3, where the two paddlewheels 12 are spaced apart from each other along the pipe 14. In this sort of arrangement each of the paddlewheels may extend beyond the middle of the pipe so as to sample a greater fraction of the flow.

Rotation of the paddlewheels, indicated by the arctuate arrows 24 in FIGS. 1 and 3, may be sensed by any suitable means. A convenient form of rotational detector 26 is an electronic impedance type as described in the inventor's U.S.

Pat. No. 4,829,833, the disclosure of which is herein incorporated by reference. However, other types of detectors, such as optical and Hall Effect rotational sensors may also be used.

The two rotation rate signals, which are indicative of flow rate, are separately amplified and are then combined in suitable electronic circuitry 30 to yield a composite signal that is output as being representative of the flow rate. In most cases, this composite signal is an arithmetic average.

Because each paddlewheel has its own signal channel 32a, 32b, signals from the two rotation sensors may be processed separately. The two signals should track each other within acceptable limits. If they fail to do so, this can be detected. Such may be the case because of a defect in one of the wheels, its bearing system or the supporting electronics, or because of trash or scale accumulation. In any case, it is highly improbable that a sensor defect or flow induced problem (except one of massive proportions which will stop one or both output signals) will affect both signals in the same way and therefore, improper operation will be detected. The accuracy of this sensor when no malfunction is detected may therefore be relied upon with greater assurance than that of single element paddlewheel and turbine sensors.

Of further note is the relative permanence of calibration afforded by the dual paddlewheel sensor over single element paddlewheel and turbine types. This arises from the fact that if one of the wheels becomes inhibited in its rotation because of mechanical defect or trash, the flow through the sensor may be partially redirected so as to speed up the other wheel. In this case the average of the two signals is maintained closer to the correct value. If the difference in signals is significant and the wheel vanes account for only a small portion of the cross sectional area represented by the flow channel, the signal from the higher frequency output channel may be used alone with a relatively small accuracy penalty. This presumably would only be a temporary situation until appropriate corrective measures are taken.

A dual paddlewheel sensor of the invention may be especially beneficial when a flow measurement is to be made immediately downstream from a ninety degree elbow. This flow diversion leads to an off-centered flow profile in which the flow rate near the inside radius of the elbow is substantially reduced while the rate near the outer radius of the elbow is substantially increased. If only a single prior art paddlewheel is used immediately downstream of the elbow, its inability to intercept most of the flow leads to serious flow measurement error. The extent of the error would largely depend on the orientation of the elbow with respect to the rotational axis of the paddlewheel. With the dual opposed paddlewheels of the present invention, when the plane of the elbow is perpendicular to the rotational axes of the paddlewheels, one wheel will rotate faster than the other, but their averaged outputs can provide an accurate indication of the total flow. On the other hand, if the plane of the elbow contains the rotational axes of the paddlewheels, both paddlewheels will rotate at the same rate so that they will still provide an accurate indication of the total flow. At an intermediate angle, the averaged rotation from the wheels can also provide an accurate indication of flow rate.

Rotating flow components are produced in plumbing systems when two elbows are used in the same rotational direction and plane. Paddlewheel sensors of the invention are generally insensitive to those rotating components and are therefore superior to conventional axial turbine meters in these applications.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. Apparatus for measuring a rate of flow of fluid through a pipe, the apparatus comprising:
   two paddlewheels having a common radius, the paddlewheels independently rotatable about mutually parallel rotation axes perpendicular to the pipe and symmetrically displaced from a centerline thereof, wherein only a respective tangential portion of each paddlewheel, the tangential portion smaller than the common radius, is directly impacted by the fluid when the fluid is flowing;
   two rotation detectors, each respectively associated with one of the paddlewheels and operable to provide a respective output representative of a respective rotation rate thereof; and
   a circuit operable to combine the two rotation rate outputs to generate a composite output representative of the rate of flow of the fluid.

2. The apparatus of claim 1 wherein the mutually parallel rotation axes are displaced from the centerline of the pipe by more than an internal radius of the pipe.

3. The apparatus of claim 1 wherein the mutually parallel rotation axes are at a common position along the pipe.

4. The apparatus of claim 1 wherein the mutually parallel rotation axes are spaced apart from each other along the pipe.

5. The apparatus of claim 1 wherein the two paddlewheels are disposed for rotation within a housing cavity having a cross-sectional size and shape selected so that the walls of the cavity are closely spaced from the paddlewheels.

6. The apparatus of claim 1 wherein the common radius of the paddlewheels is larger than an internal radius of the pipe.

* * * * *